(12) United States Patent
Fripp et al.

(10) Patent No.: US 9,222,828 B2
(45) Date of Patent: Dec. 29, 2015

(54) DOWNHOLE FLOW MEASUREMENTS WITH OPTICAL DISTRIBUTED VIBRATION/ACOUSTIC SENSING SYSTEMS

(71) Applicant: HALLIBURTON ENERGY SERVICES, INC., Houston, TX (US)

(72) Inventors: Michael L. Fripp, Carrollton, TX (US); Neal G. Skinner, Lewisville, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 294 days.

(21) Appl. No.: 13/896,418

(22) Filed: May 17, 2013

(65) Prior Publication Data

US 2014/0338438 A1 Nov. 20, 2014

(51) Int. Cl.
*E21B 49/00* (2006.01)
*G01H 9/00* (2006.01)
*E21B 47/00* (2012.01)
*E21B 47/12* (2012.01)

(52) U.S. Cl.
CPC ............ *G01H 9/004* (2013.01); *E21B 47/0005* (2013.01); *E21B 47/123* (2013.01)

(58) Field of Classification Search
None
See application file for complete search history.

(56) References Cited

U.S. PATENT DOCUMENTS

| 8,347,958 | B2 | 1/2013 | Hartog et al. | |
|---|---|---|---|---|
| 8,505,625 | B2 * | 8/2013 | Ravi et al. | 166/250.14 |
| 2003/0094281 | A1 * | 5/2003 | Tubel | 166/250.03 |
| 2008/0047662 | A1 | 2/2008 | Dria et al. | |
| 2009/0114386 | A1 | 5/2009 | Hartog et al. | |
| 2011/0088462 | A1 * | 4/2011 | Samson et al. | 73/152.18 |
| 2011/0185807 | A1 | 8/2011 | Albrecht et al. | |
| 2011/0188346 | A1 * | 8/2011 | Hull | 367/35 |
| 2011/0308788 | A1 * | 12/2011 | Ravi et al. | 166/250.01 |
| 2012/0014211 | A1 * | 1/2012 | Maida et al. | 367/13 |
| 2012/0073805 | A1 | 3/2012 | Shampine et al. | |
| 2012/0132007 | A1 * | 5/2012 | Dria et al. | 73/760 |
| 2012/0205103 | A1 * | 8/2012 | Ravi et al. | 166/285 |
| 2012/0277995 | A1 | 11/2012 | Hartog et al. | |
| 2013/0091942 | A1 | 4/2013 | Samson et al. | |
| 2013/0329522 | A1 * | 12/2013 | Skinner et al. | 367/25 |
| 2014/0036628 | A1 * | 2/2014 | Hill et al. | 367/35 |
| 2014/0180592 | A1 * | 6/2014 | Ravi et al. | 702/12 |

(Continued)

FOREIGN PATENT DOCUMENTS

WO     03/102511 A2     12/2003

OTHER PUBLICATIONS

Wikipedia; "Helmholtz Resonance", via the free encyclopedia, dated May 12, 2013, 5 pages.

*Primary Examiner* — Andre Allen
(74) *Attorney, Agent, or Firm* — Schwegman Lundberg & Woessner, P.A.; John W. Wustenberg (57) ABSTRACT

A method of verifying a substance interface location during a cementing operation can include optically measuring vibrations caused by substances flowing across structures distributed along a wellbore, the vibrations being caused at each structure, and the vibrations changing at each structure as the interface displaces across the structure. A method of determining a property of at least one substance flowed in a wellbore can include optically measuring vibrations caused by the substance flowing across structures distributed along a wellbore, the vibrations being caused at each structure, and the structures having different shapes, thereby causing the vibrations at the structures to be different from each other when the substance flows across the differently shaped structures.

30 Claims, 7 Drawing Sheets

(56) References Cited

U.S. PATENT DOCUMENTS

| | | | |
|---|---|---|---|
| 2014/0208843 A1* | 7/2014 | Godfrey | 73/152.58 |
| 2014/0285795 A1* | 9/2014 | Jaaskelainen et al. | 356/73.1 |
| 2014/0326860 A1* | 11/2014 | Choi et al. | 250/227.11 |
| 2015/0013446 A1* | 1/2015 | Godfrey | 73/152.32 |
| 2015/0075276 A1* | 3/2015 | Cooper et al. | 73/152.58 |

* cited by examiner

DOWNHOLE FLOW MEASUREMENTS WITH OPTICAL DISTRIBUTED VIBRATION/ACOUSTIC SENSING SYSTEMS

BACKGROUND

This disclosure relates generally to measurements performed optically in subterranean wells and, in an example described below, more particularly provides for downhole flow measurements with optical distributed vibration/acoustic sensing systems.

It can be beneficial to be able to determine where particular substances flowed in a wellbore are located, or what substances are positioned at particular locations. For example, in a cementing operation, it is important to be able to verify that cement has been appropriately placed in an annulus between a casing or liner and a wellbore, or between tubulars.

Therefore, it will be appreciated that improvements are continually needed in the arts of determining where particular substances flowed in a wellbore are located, and determining what substances are positioned at particular locations. Such improvements can be useful in operations other than cementing operations, and in determining locations of substances other than cement (such as, gels, spacers, drilling mud, completion fluids, produced or injected fluids, etc.).

DETAILED DESCRIPTION

Figure 1:
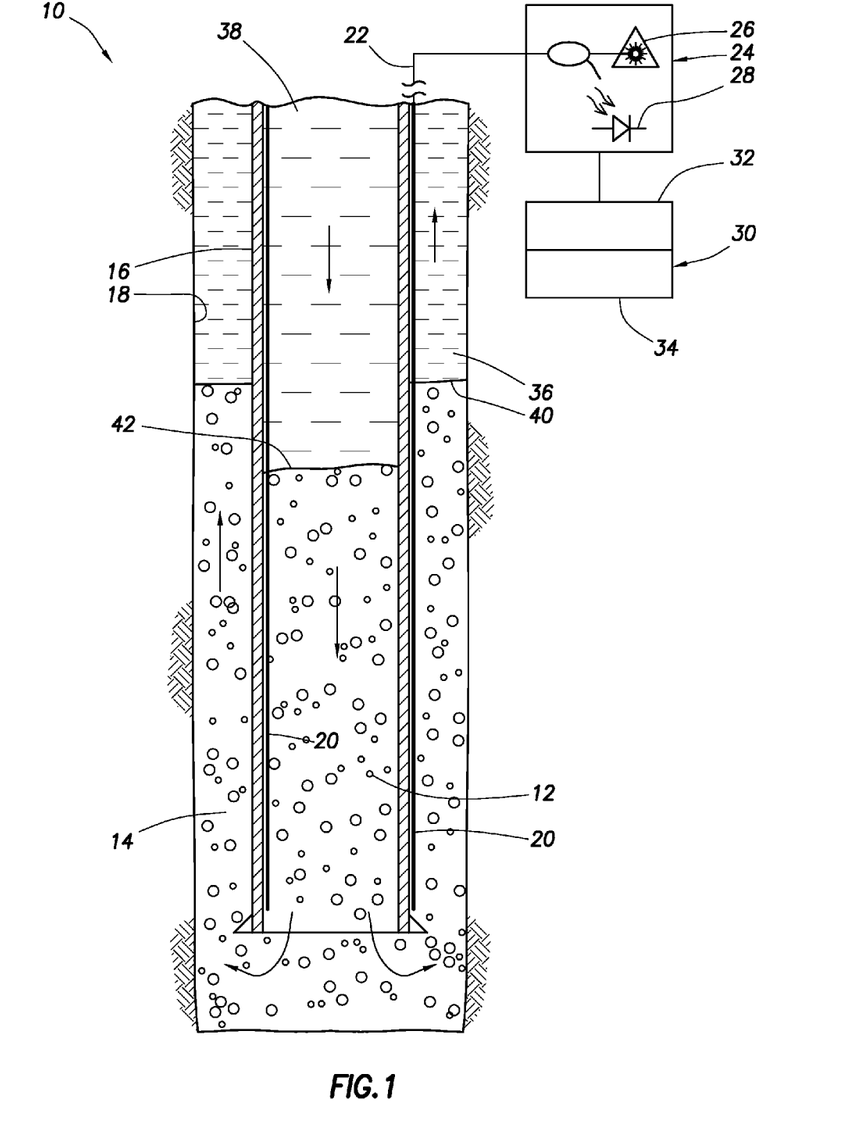
FIG. 1 is a representative partially cross-sectional view of a well system and associated method which can embody principles of this disclosure.

Representatively illustrated in FIG. 1 is a system 10 and associated method which can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the FIG. 1 example, a cementing operation is performed, in which a cement composition 12 is placed in an annulus 14 formed between a tubular string 16 and a wellbore 18. It is desired, in this example, to verify displacement and location of the cement composition 12 during the cementing operation, for example, to verify that the cement composition is appropriately placed in the annulus 14.

However, it should be clearly understood that the scope of this disclosure is not limited to use only during a cementing operation. Principles of this disclosure could, in other examples, be applied to injection, stimulation, conformance, gravel packing, production, or any other type of well operation.

As used herein, the term "cement composition" is used to indicate a hardenable material which is used to seal off an annular space in a well, such as the annulus 14. A cement composition is not necessarily cementitious, since other types of materials (e.g., polymers, such as epoxies, etc.) can be used in place of, or in addition to, a Portland type of cement. A cement composition can harden by hydrating, by passage of time, by application of heat, by cross-linking, and/or by any other technique.

The tubular string 16 may be any type of tubular string through which a flowable substance may be flowed. For example, the tubular string 16 could be of the types known to those skilled in the art as tubing, casing or liner. The scope of this disclosure is not limited to use with any particular type of tubular string.

In the FIG. 1 example, the displacement and position of the cement composition 12 can be determined by use of one or more optical lines 20 positioned in the wellbore 18. As depicted in FIG. 1, one optical line 20 is positioned external to the tubular string 16, and another optical line is positioned internal to the tubular string.

However, the optical lines 20 could be positioned in other locations, if desired. For example, an optical line could be positioned in a wall of the tubular string 16, in another tubular string (such as, a coiled tubing) conveyed into the tubular string, etc.). Thus, the scope of this disclosure is not limited to any particular position of an optical line.

For clarity of discussion, only one of the optical lines 20 will be referred to in the description below, it being understood that any number of optical lines may be used. The optical line 20 may comprise a cable, a tubing, armor, protective sheathing, etc. The scope of this disclosure is not limited to use of any particular type of optical line.

The optical line 20 includes an optical waveguide 22. The optical waveguide 22 is connected to an optical interrogator 24 (for example, at a surface location). In this example, the interrogator 24 includes at least an optical source 26 (such as, an infrared laser, a light emitting diode, etc.) and an optical sensor 28 (such as, a photo-detector, photodiode, etc.). In some examples, the interrogator 24 could include an optical time domain reflectometer (OTDR).

The interrogator 24 may detect Brillouin backscatter gain or coherent Rayleigh backscatter which results from light being transmitted through the optical waveguide 22. However, the scope of this disclosure is not limited to use of any particular type of interrogator.

Operation of the interrogator 24 is controlled by a computer 30 including, for example, at least a processor 32 and memory 34. Instructions for operating the interrogator 24, and information output by the interrogator, may be stored in the memory 34. The computer 30 also preferably includes provisions for user input and output (such as, a keyboard, display, printer, touch-sensitive input, etc.). However, the scope of this disclosure is not limited to use of any particular type of computer.

In this example, the optical waveguide 22 is used to detect acoustic or vibrational energy as distributed along the waveguide. The optical waveguide 22 may comprise an optical fiber, optical ribbon or any other type of optical waveguide. The optical waveguide 22 may comprise a single mode or multi-mode waveguide, or any combination thereof.

One or more distributed optical sensing techniques may be used in the system 10. These techniques can include detection of Brillouin backscatter and/or coherent Rayleigh backscatter resulting from transmission of light through the optical waveguide 22. Raman backscatter may also be detected and, if used in conjunction with detection of Brillouin backscatter, may be used for thermally calibrating the Brillouin backscatter detection data in situations, for example, where accurate strain measurements are desired.

Optical sensing techniques can be used to detect static strain, dynamic strain, acoustic vibration and/or temperature. These optical sensing techniques may be combined with any other optical sensing techniques, such as hydrogen sensing, stress sensing, etc.

Stimulated Brillouin backscatter detection can be used to monitor acoustic energy along the optical waveguide 22. Coherent Rayleigh backscatter can be detected as an indication of vibration of the optical waveguide 22.

The optical waveguide 22 could include one or more waveguides for Brillouin backscatter detection, depending on the Brillouin method used (e.g., linear spontaneous or non-linear stimulated). The Brillouin backscattering detection technique measures the natural acoustic velocity via corresponding scattered photon frequency shift in the waveguide 22 at a given location along the waveguide.

Coherent Rayleigh backscatter can be used to monitor dynamic strain (e.g., acoustic pressure and vibration). Coherent Rayleigh backscatter detection techniques can detect acoustic signals which result in vibration of the optical waveguide 22.

Raman backscatter detection techniques are preferably used for monitoring distributed temperature. Such techniques are known to those skilled in the art as distributed temperature sensing (DTS).

Raman backscatter is relatively insensitive to distributed strain, although localized bending in a waveguide can be detected. Temperature measurements obtained using Raman backscatter detection techniques can, for example, be used for temperature calibration of Brillouin backscatter measurements.

Raman light scattering is caused by thermally influenced molecular vibrations. Consequently, the backscattered light carries the local temperature information at the point where the scattering occurred.

The amplitude of an Anti-Stokes component is strongly temperature dependent, whereas the amplitude of a Stokes component of the backscattered light is not. Raman backscatter sensing requires some optical-domain filtering to isolate the relevant optical frequency (or optical wavelength) components, and is based on the recording and computation of the ratio between Anti-Stokes and Stokes amplitude, which contains the temperature information.

Since the magnitude of the spontaneous Raman backscattered light is quite low (e.g., 10 dB less than Brillouin backscattering), high numerical aperture (high NA) multi-mode optical waveguides are typically used, in order to maximize the guided intensity of the backscattered light. However, the relatively high attenuation characteristics of highly doped, high NA, graded index multi-mode waveguides, in particular, limit the range of Raman-based systems to approximately 10 km.

Brillouin light scattering occurs as a result of interaction between the propagating optical signal and thermally excited acoustic waves (e.g., within the GHz range) present in silica optical material. This gives rise to frequency shifted components in the optical domain, and can be seen as the diffraction of light on a dynamic in situ "virtual" optical grating generated by an acoustic wave within the optical media. Note that an acoustic wave is actually a pressure wave which introduces a modulation of the index of refraction via an elasto-optic effect.

The diffracted light experiences a Doppler shift, since the grating propagates at the acoustic velocity in the optical media. The acoustic velocity is directly related to the silica media density, which is temperature and strain dependent. As a result, the so-called Brillouin frequency shift carries with it information about the local temperature and strain of the optical media.

Note that Raman and Brillouin scattering effects are associated with different dynamic non-homogeneities in silica optical media and, therefore, have completely different spectral characteristics.

Coherent Rayleigh light scattering is also caused by fluctuations or non-homogeneities in silica optical media density, but this form of scattering is purely "elastic." In contrast, both Raman and Brillouin scattering effects are "inelastic," in that "new" light or photons are generated from the propagation of the laser probe light through the media.

In the case of coherent Rayleigh light scattering, temperature or strain changes are identical to an optical source (e.g., very coherent laser) wavelength change. Unlike conventional Rayleigh backscatter detection techniques (using common optical time domain reflectometers), because of the extremely narrow spectral width of the laser source (with associated long coherence length and time), coherent Rayleigh (or phase Rayleigh) backscatter signals experience optical phase sensitivity resulting from coherent addition of amplitudes of the light backscattered from different parts of the optical media which arrive simultaneously at a photo-detector.

In the FIG. 1 example, the cement composition 12 displaces another substance 36 in the annulus 14, as the cement composition flows into the annulus. The substance 36 could be of the type known to those skilled in the art as a "spacer," or a "pill." However, the scope of this disclosure is not limited to displacement of any particular substance by the cement composition 12.

The cement composition 12 is itself displaced through the tubular string 16 by another substance 38. The substance 38 could be of the type known to those skilled in the art as "mud," "brine," or another fluid. The scope of this disclosure is not limited to use of any particular substance to displace the cement composition 12 through the tubular string 16.

It will be appreciated that an interface 40 exists between the cement composition 12 and the substance 36. Another interface 42 exists between the cement composition 12 and the substance 38. In one aspect of this disclosure, a displacement and location of each of the interfaces 40, 42, and a displacement and location of each of the substances 36, 38 and the cement composition 12 can be monitored in real time as the cementing operation progresses. In another aspect of this disclosure, properties (such as, viscosity, velocity and density) of each of the substances 36, 38 and the cement composition 12 can be detected using the optical waveguide 22.

Note that, although the substances 36, 38 are identified in this description as such, but the cement composition 12 is identified more specifically, it should be understood that the cement composition 12 is also a flowable "substance," and it is not necessary for a cement composition to be used in keeping with the scope of this disclosure. Thus, the scope of this disclosure is not limited to determining the displacement, location and/or properties of any particular type of substance or combination of substances.

In this example, for determining the displacement, location and/or properties of a substance or combination of substances in a well, bluff bodies or other types of structures are used to produce acoustic or other types of vibrations in response to flow. Bluff bodies are three dimensional shapes, around which vortices form when the bluff bodies are placed in a flow stream. The vortices periodically break off (or "shed") from the bluff bodies, and a frequency of this vortex shedding depends on the velocity, viscosity and density of the fluid.

Periodic vortex shedding results in periodic fluctuations in pressure around a bluff body. These periodic fluctuations can be detected as a periodic acoustic or vibrational signal.

In some examples, a bluff body may protrude into the fluid flow. In other examples, where space restrictions are present, it may be preferable to use other types of structures (such as, recesses, grooves, profiles, etc.) which do not protrude into the fluid flow, or to use existing structures (such as collars, etc.) which are already present.

As mentioned above, the vortices will be shed in a periodic manner. A frequency of vortex shedding, f, is related to a Strouhal Number, S, as follows:

$$f=S*U/D \quad (1)$$

where U is a free stream flow velocity approaching a bluff body, and D is a characteristic dimension of the bluff body. Thus, the frequency of vibrations detected by the optical waveguide 22 will be directly dependent on the velocity U of the cement composition 12 or substances 36, 38.

The Strouhal Number S is not a constant. Instead, it is a function of a shape of the bluff body, as well as of Reynolds Number and, to a lesser extent, on surface roughness and free stream turbulence. For non-circular bluff bodies, a relative angle of the free stream flow with respect to the bluff body will also have a strong effect on the Strouhal Number.

At low Reynolds Numbers, the vortex shedding will be at substantially a single frequency. At higher Reynolds Numbers, the vortex shedding will occur over a band of frequencies.

Figure 2:
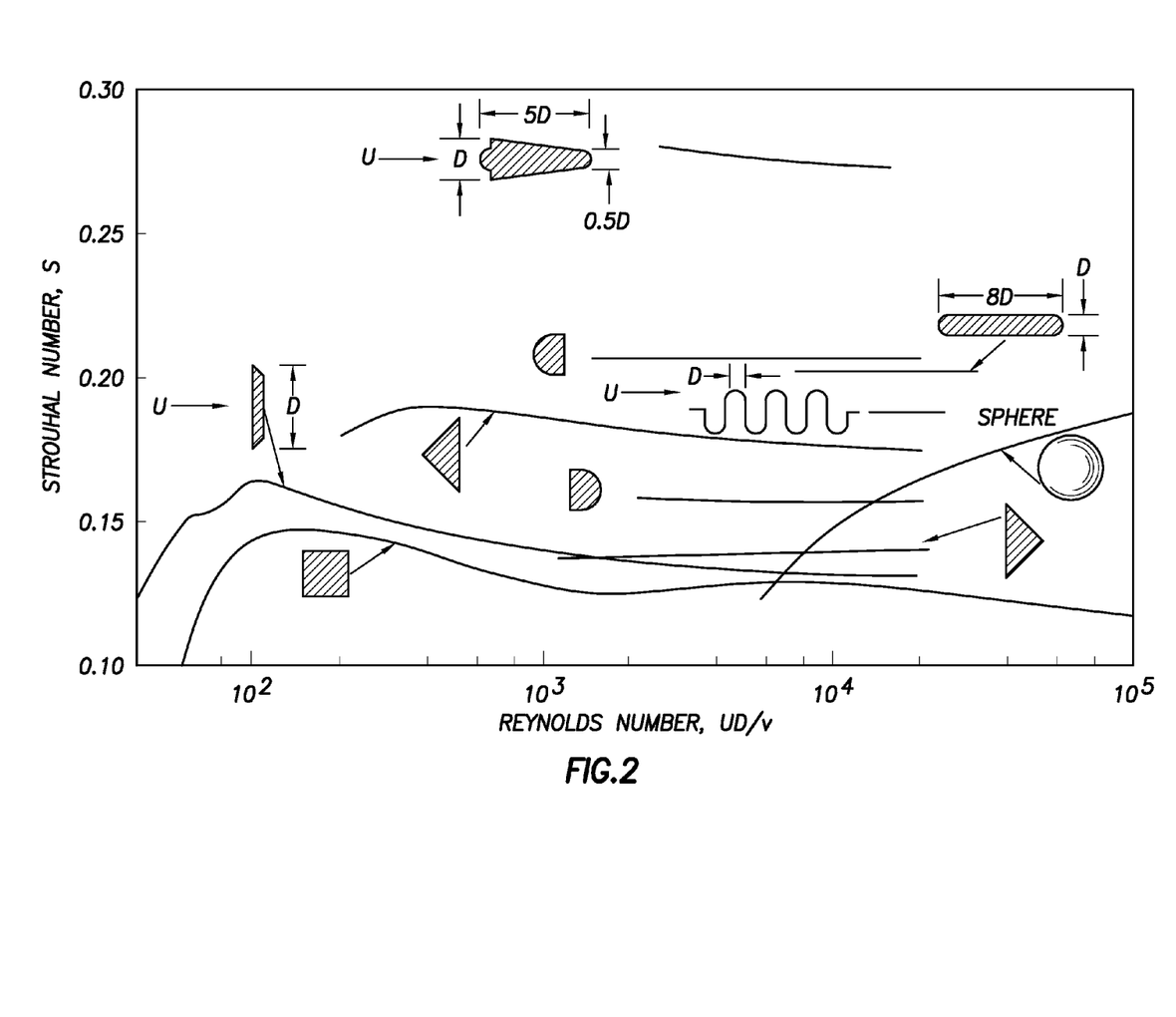
FIG. 2 is a representative graph of Strouhal Number versus Reynolds Number for various shapes of bluff bodies.
Figure 3:
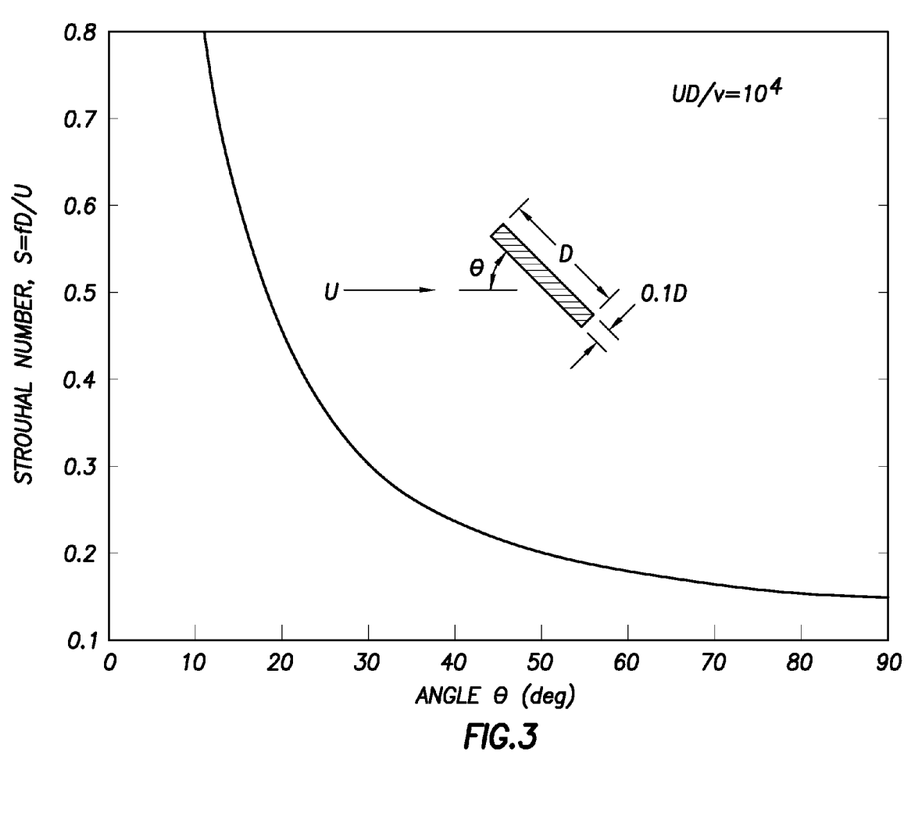
FIG. 3 is a representative graph of Strouhal Number versus Angle for a rectangular bluff body at a Reynolds Number of $1 \times 10^4$.

The dependence of the Strouhal Number on the bluff body shape and Reynolds Number is depicted in FIG. 2. The dependence of the Strouhal Number on the angle of flow relative to a non-circular bluff body is depicted in FIG. 3. FIGS. 2 & 3 were derived from Blevins, R., Flow Induced Vibration, 2d. Ed. (Krieger Pub. Co., 2001).

In the FIG. 1 system 10, the density and viscosity of the substances 36, 38 will generally be significantly different from the cement composition 12. Thus, as the interfaces 40, 42 displace in the well, the frequency of vortex shedding detected by the optical waveguide 22 will also change significantly at each location along the waveguide across which the interfaces flow. Since the vibrations generated by the bluff bodies (or other structures) in the flow are detected along the waveguide 22, the location and displacement of the cement composition 12 and substances 36, 38 in the tubular string 16 and/or in the annulus 14 can be readily determined.

Preferably, a size and shape of the bluff bodies (or other structures) are chosen, such that the Strouhal Number is very different for the different substances 12, 36, 38. For example, hemi-circles have very little variation in their Strouhal Number as a function of Reynolds Number (see FIG. 2), and would therefore be a poor choice.

A sphere, on the other hand, has a large variation in Strouhal Number as a function of Reynolds Number, and would therefore be a good choice, as long as the Reynolds Number of the flow is in a region from about $5 \times 10^3$ to $1 \times 10^5$. At lower Reynolds Number, a square or pyramidal shape would be a better choice.

In situations where it is not desired for bluff bodies to protrude into a flow stream, recesses, grooves, profiles or other structures may be formed on an interior or exterior of tubulars, collars, centralizers or other equipment. Thus, the scope of this disclosure is not limited to use of any particular type of structure used to create vibrations in a flow stream.

In some examples, the waveguide 22 may be used to detect vibrations produced in substances by bluff bodies or other structures. In other examples, the waveguide 22 may be used to detect vibrations produced in other members by the pressure fluctuations created by the bluff bodies or other structures. In further examples, the waveguide 22 may be used to detect vibrations in the bluff bodies or other structures themselves.

Since the vortex shedding frequency f is a function of velocity, viscosity and density, it is also possible to arrange an array of differently shaped and/or dimensioned bluff bodies or other structures, so that the properties (e.g., velocity, viscosity, density) of the substance flowing across the structures can be determined. That is, by comparing the different vortex frequencies generated at the respective different structures, the properties of the substance flowing across the structures can be readily deduced.

Figure 4:
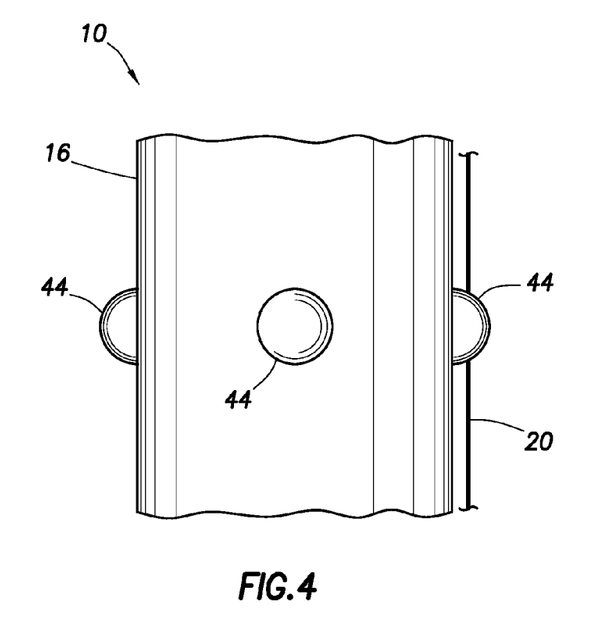
FIG. 4 is a representative side view of an optical line and bluff bodies on a tubular string in the well system of FIG. 1.

Referring additionally now to FIG. 4, a longitudinal section of the tubular string 16 in the system 10 is representatively illustrated. In this view, it may be seen that several hemi-spherically shaped structures 44 are positioned externally on the tubular string 16.

Although only one longitudinal section of the tubular string 16 having the structures 44 thereon is depicted in FIG. 4 (and in other drawing figures), preferably such sections are distributed along the tubular string in portions of the wellbore 18 where it is desired to monitor the flow of the substances 12, 36, 38 and/or the interfaces 40, 42. Thus, a series of longitudinally distributed structures 44 are positioned in the wellbore 18.

Although several of the structures 44 are depicted in the longitudinal section of the tubular string 16 in FIG. 4, any number (including one) of the structure(s) may be used in other examples. The optical line 22 extends through one of the structures 44 in the FIG. 4 example, but in other examples the optical line may be otherwise positioned.

Figure 5:
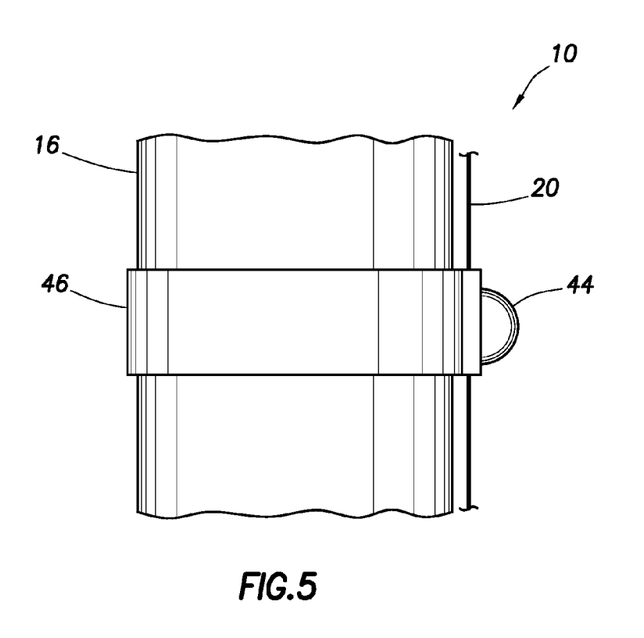
FIG. 5 is a representative side view of the optical line and a bluff body on a clamp securing the optical line to the tubular string.

Referring additionally now to FIG. 5, another example is representatively illustrated, in which the structure 44 is positioned on a clamp 46 used to secure the optical line 20 to the tubular string 16. In other examples, the clamp 46 itself may serve as a structure which causes pressure fluctuations in flow due to vortex shedding.

Figure 6:
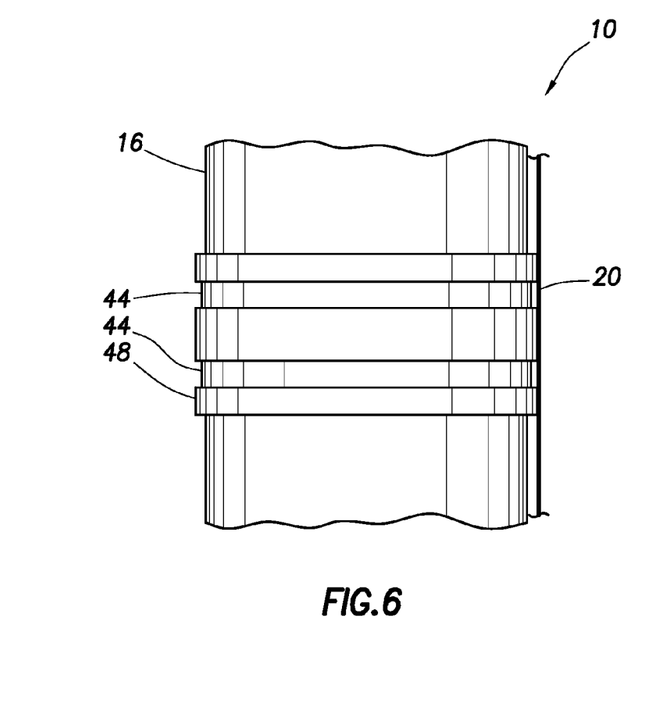
FIG. 6 is a representative side view of the optical line and recesses on a coupling of the tubular string.

Referring additionally now to FIG. 6, another example is representatively illustrated, in which the structures 44 are formed as recesses or grooves external to the tubular string 16. In this example, the structures 44 are formed on a coupling or collar 48 used to connect two longitudinal sections of the tubular string 16. In other examples, the collar 48 itself may serve as a structure which causes pressure fluctuations in flow due to vortex shedding.

Figure 7:
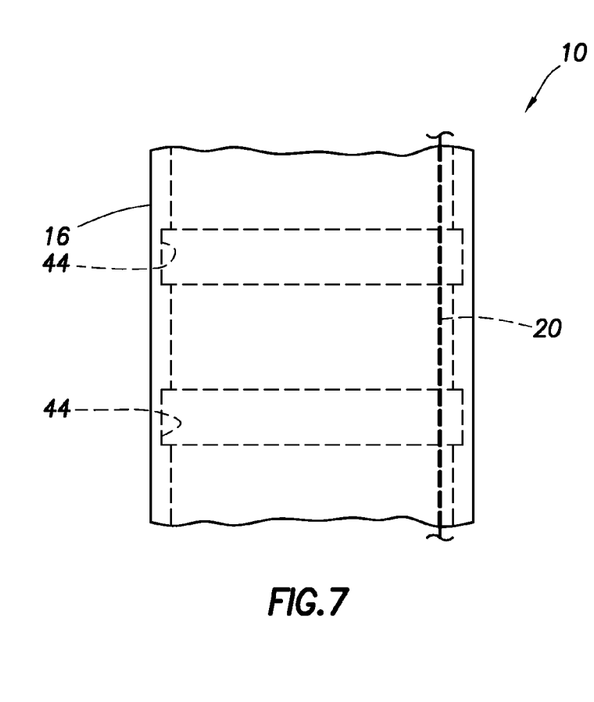
FIG. 7 is a representative side view of the optical line and recesses in the tubular string.

Referring additionally now to FIG. 7, another example is representatively illustrated, in which the structures 44 are formed as recesses or grooves on an interior surface of the tubular string 16. The optical line 20 is also positioned in the tubular string 16 in this example. The optical line 20 could be installed in the well with the tubular string 16, or it could be conveyed into the tubular string later (for example, for use during the cementing operation).

In the FIGS. 6 & 7 examples, one or more resonant chambers (not shown) could be in communication with the recesses, grooves or other structures 44. In some examples, the structures 44 and resonant chambers could form devices known to those skilled in the art as Helmholtz resonators.

Figure 8:
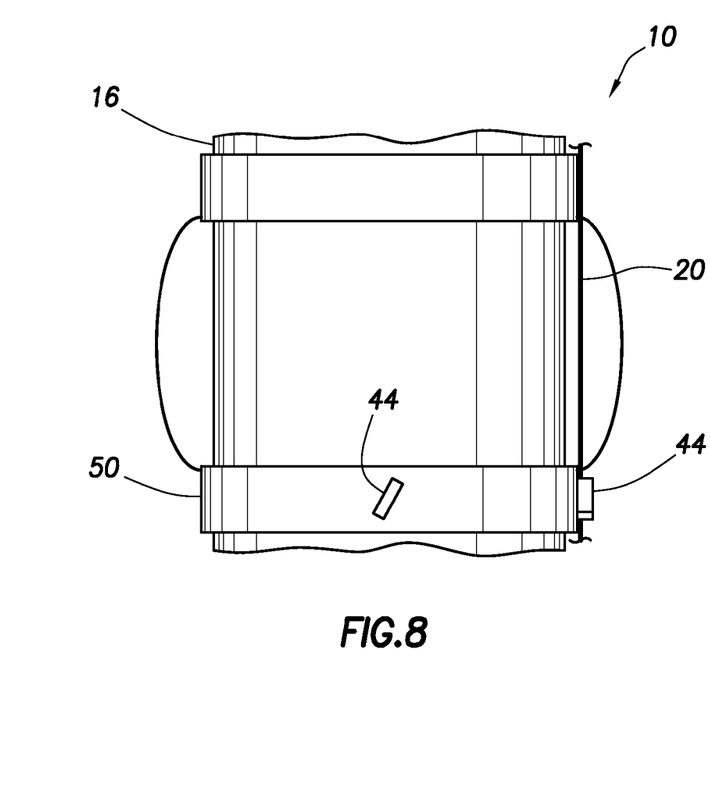
FIG. 8 is a representative side view of the optical line and recesses on a centralizer of the tubular string.

Referring additionally now to FIG. 8, another example is representatively illustrated, in which the structures 44 are positioned on a centralizer 50 used to centralize the tubular string 16 in the wellbore 18 (or in another tubular). In other examples, the centralizer 50 itself may serve as a structure which causes pressure fluctuations in flow due to vortex shedding.

Note that the structures 44 in the FIG. 8 example are non-circular, and are similar to the bluff body for which Strouhal Number is plotted versus Reynolds Number in the graph of FIG. 3.

Figure 9:
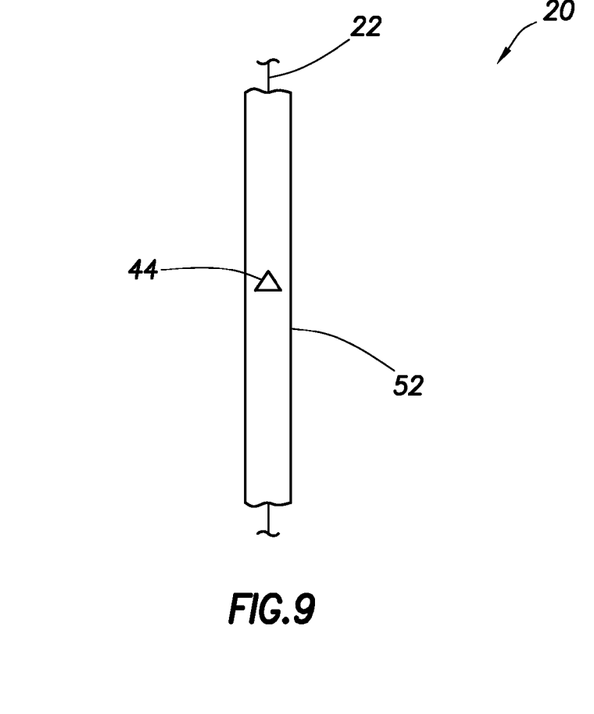
FIG. 9 is a representative side view of the optical line having an optical waveguide therein, and a bluff body external to an enclosure for the optical waveguide.

Referring additionally now to FIG. 9, a longitudinal section of the optical line 20 is representatively illustrated. In this example, the structure 44 is positioned on an enclosure 52 for the optical waveguide 22. For example, the optical waveguide 22 could be enclosed in a coiled tubing or control line, or in a protective sheath of a cable. Thus, the structure 44 can be conveyed into the well, or otherwise positioned in the well, as part of the optical line 20.

Figure 10:
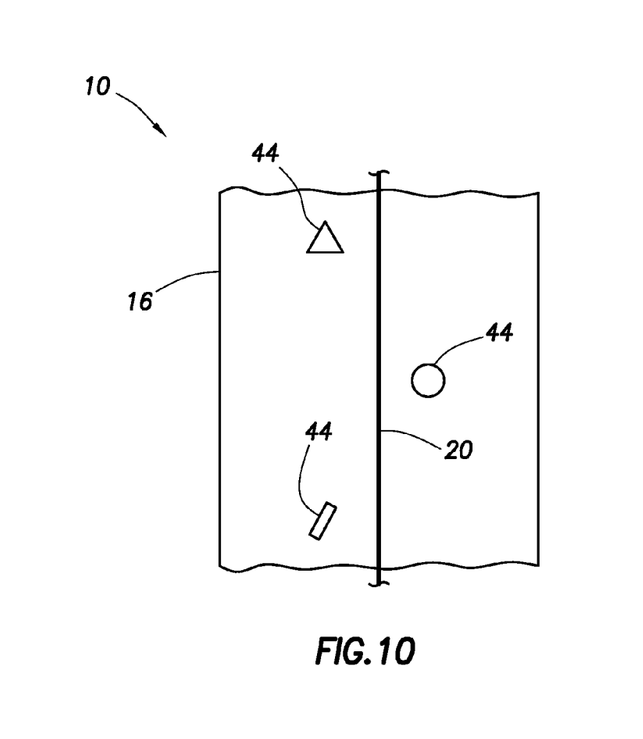
FIG. 10 is a representative side view of the optical line and differently shaped bluff bodies on the tubular string.

Referring additionally now to FIG. 10, another example is representatively illustrated, in which differently sized and/or shaped structures 44 are used to produce different vortex shedding frequencies in the fluid flow. As discussed above, such differently shaped/sized structures 44 can be used to determine various properties (e.g., density, velocity, viscosity) of the substances 12, 36, 38 flowing across the structures.

Figure 11:
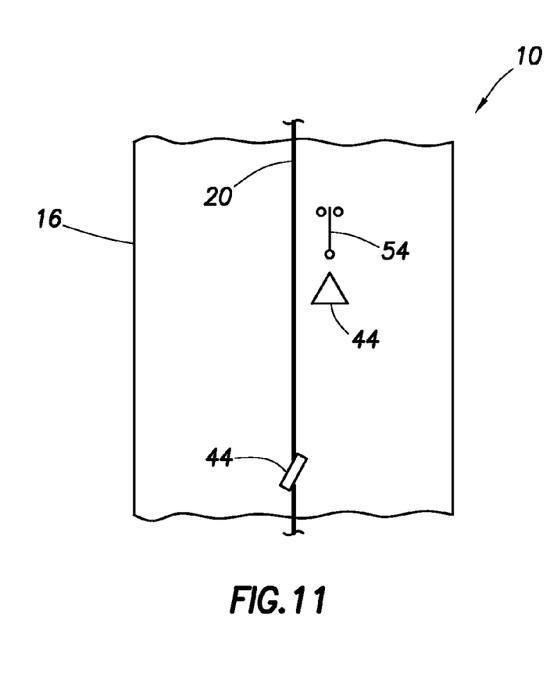
FIG. 11 is a representative side view of the optical line, bluff bodies and a vibrating member on the tubular string.

Referring additionally now to FIG. 11, another example is representatively illustrated, in which the optical line 20 extends through, or otherwise contacts, a structure 44. In this manner, the optical waveguide 22 can detect vibration of the structure 44 itself due to the vortices being shed in response to flow across the structure. However, it is not necessary for the optical line 20 to contact the structure 44 in order for the optical waveguide 22 to detect vibration of the structure.

In some examples, the structure 44 may be relatively flexible, so that it flexes or "flutters" in response to the fluid flow adjacent the structure. The structure 44 may be shaped similar to an airfoil. Note that vortex shedding is not necessary to cause flexing or fluttering of the structure 44.

In aerodynamic flutter, there is a coupling between structural bending modes, deflection modes and aerodynamic forcing due to the flowing fluid. Different fluids flowing across the structure 44 will cause different levels of this aerodynamic forcing, as well as different natural vibrational modes of the structure 44, and different damping of the vibrational modes. These differences can be used to distinguish between the different substances 12, 36, 38 flowing across the structure 44, and to indicate when an interface 40, 42 displaces past the structure.

In addition, the FIG. 11 example includes another structure 44 positioned upstream of a member 54. The member vibrates in response to the vortices being shed from the structure 44. When the member 54 vibrates, acoustic signals are produced, and these acoustic signals are detected by the optical waveguide 22 in the optical line 20.

It may now be fully appreciated that the above disclosure provides significant advancements to the art of making measurements optically in a well. In various examples described above, the displacement, position and/or properties of various substances 12, 36, 38 and/or interfaces 40, 42 in a well can be determined by use of an optical waveguide 22 which detects vibration due to flow of the substance(s) across structures 44.

A method of verifying a substance interface 40, 42 location during a cementing operation is described above. In one example, the method can comprise optically measuring vibrations caused by substances 12, 36, 38 flowing across structures 44 distributed along a wellbore 18, the vibrations being caused at each structure 44, and the vibrations changing at each structure 44 as the interface 40, 42 displaces across the structure 44.

The structures 44 may comprise bluff bodies or recesses. The structures 44 may flex in response to the substances 12, 36, 38 flowing.

The optically measuring step may comprise detecting backscatter of light in at least one optical waveguide 22 positioned in the wellbore 18.

At least one of the optical waveguide 22 and the structures 44 can be positioned in or external to a tubular string 16 through which the substances 12, 36, 38 are flowed.

The optical waveguide 22 may be conveyed into the wellbore 18 within an enclosure 52, with the structures 44 being positioned on the enclosure 52. The substances 12, 36, 38 may be flowed external to, but not internal to, the enclosure 52.

The detected backscatter can comprise coherent Rayleigh backscatter and/or Brillouin backscatter.

In some examples, at least one of the substances comprises a cement composition 12.

The structures 44 may have different shapes, thereby causing the vibrations at the structures 44 to be different from each other when one of the substances 12, 36, 38 flows across the structures 44.

The method can also comprise determining a property of one or more of the substances 12, 36, 38 based on the different vibrations at the differently shaped structures 44.

The optically measuring step may further comprise an optical waveguide 22 detecting the structures 44 vibrating.

In some examples, the optically measuring step may comprise an optical waveguide 22 detecting members 54 vibrating in response to vortices shed by the structures 44.

Also described above is a method of determining a property of at least one substance 12, 36, 38 flowed in a wellbore 18. In one example, the method can comprise: optically measuring vibrations caused by the substance 12, 36, 38 flowing across structures 44 distributed along a wellbore 18, the vibrations being caused at each structure 44. The structures 44 have different shapes, thereby causing the vibrations at the structures 44 to be different from each other when the substance 12, 36, 38 flows across the differently shaped structures 44.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A method of verifying a substance interface location during a cementing operation, the method comprising:
   optically measuring vibrations caused by substances flowing across structures distributed along a wellbore, the vibrations being caused at each structure; and
   the vibrations changing at each structure as the interface displaces across the structure during the cementing operation.

2. The method of claim 1, wherein the structures comprise bluff bodies.

3. The method of claim 1, wherein the structures comprise recesses.

4. The method of claim 1, wherein the structures flex in response to the substances flowing.

5. The method of claim 1, wherein the optically measuring further comprises detecting backscatter of light in at least one optical waveguide positioned in the wellbore.

6. The method of claim 5, wherein at least one of the optical waveguide and the structures is/are positioned in a tubular string through which the substances are flowed.

7. The method of claim 5, wherein at least one of the optical waveguide and the structures is/are positioned external to a tubular string through which the substances are flowed.

8. The method of claim 5, wherein the optical waveguide is conveyed into the wellbore within an enclosure, the structures being positioned on the enclosure, and the substances being flowed external to, but not internal to, the enclosure.

9. The method of claim 5, wherein the backscatter comprises coherent Rayleigh backscatter.

10. The method of claim 5, wherein the backscatter comprises Brillouin backscatter.

11. The method of claim 1, wherein at least one of the substances comprises a cement composition.

12. The method of claim 1, wherein the structures have different shapes, thereby causing the vibrations at the structures to be different from each other when one of the substances flows across the structures.

13. The method of claim 12, further comprising determining a property of the one of the substances based on the different vibrations at the differently shaped structures.

14. The method of claim 1, wherein the optically measuring further comprises an optical waveguide detecting the structures vibrating.

15. The method of claim 1, wherein the optically measuring further comprises an optical waveguide detecting members vibrating in response to vortices shed by the structures.

16. A method of determining a property of at least one substance flowed in a wellbore, the method comprising:
    optically measuring vibrations caused by the substance flowing across structures distributed along a wellbore, the vibrations being caused at each structure, and
    wherein the structures have different shapes, thereby causing the vibrations at the structures to be different from each other when the substance flows across the differently shaped structures.

17. The method of claim 16, further comprising determining a property of the substance based on the different vibrations at the differently shaped structures.

18. The method of claim 16, wherein the structures comprise bluff bodies.

19. The method of claim 16, wherein the structures comprise recesses.

20. The method of claim 16, wherein the structures flex in response to the substances flowing.

21. The method of claim 16, wherein the optically measuring further comprises detecting backscatter of light in at least one optical waveguide positioned in the wellbore.

22. The method of claim 21, wherein at least one of the optical waveguide and the structures is/are positioned in a tubular string through which the substance is flowed.

23. The method of claim 21, wherein at least one of the optical waveguide and the structures is/are positioned external to a tubular string through which the substance is flowed.

24. The method of claim 21, wherein the optical waveguide is conveyed into the wellbore within an enclosure, the structures being positioned on the enclosure, and the substance being flowed external to, but not internal to, the enclosure.

25. The method of claim 21, wherein the backscatter comprises coherent Rayleigh backscatter.

26. The method of claim 21, wherein the backscatter comprises Brillouin backscatter.

27. The method of claim 16, wherein the substance comprises a cement composition.

28. The method of claim 16, wherein the optically measuring further comprises an optical waveguide detecting the structures vibrating.

29. The method of claim 16, wherein the optically measuring further comprises an optical waveguide detecting members vibrating in response to vortices shed by the structures.

30. The method of claim 16, wherein the at least one substance comprises multiple substances, the vibrations changing at each structure as an interface between the substances displaces across the structure.

* * * * *